Dec. 17, 1968     R. W. OLESON ET AL     3,416,230

MEANS FOR MEASURING MOVEMENT IN MASSES OF ROCK OR THE LIKE

Filed July 11, 1966     2 Sheets-Sheet 1

INVENTORS
Raymond W. Oleson &
Elmo G. Leishman

BY *J. Hanson Boyden*,

ATTORNEY

Dec. 17, 1968 R. W. OLESON ETAL 3,416,230
MEANS FOR MEASURING MOVEMENT IN MASSES OF ROCK OR THE LIKE
Filed July 11, 1966 2 Sheets-Sheet 2

INVENTORS
Raymond W. Oleson &
Elmo G. Leishman

BY *J. Hanson Boyden*

ATTORNEY

United States Patent Office 3,416,230
Patented Dec. 17, 1968

3,416,230
MEANS FOR MEASURING MOVEMENT IN
MASSES OF ROCK OR THE LIKE
Raymond W. Oleson, 1041 Mildred, Chico, Calif. 95226,
and Elmo G. Leishman, 3629 Ashley Ave., Oroville,
Calif. 95965
Filed July 11, 1966, Ser. No. 564,319
6 Claims. (Cl. 33—1)

ABSTRACT OF THE DISCLOSURE

The apparatus is used for measuring the relaxational movement of a mass of rock or the like when it is relieved of its stress by removing a part of the confining support, as in open cut excavations, tunnels, etc. It comprises a pair of independent expansion bolts adapted to be anchored at inner and outer spaced points in a hole drilled into the mass of rock. A rod is anchored at one end to the bolt at the inner point and extends loosely through the hole into an opening in the bolt at the outer point, and a manually movable meter, at the bolt at the outer point, and co-operating with the free end of said rod measures the relative movement which has taken place between the bolts at the two points.

This invention relates to apparatus for detecting and measuring relative movements between two or more points in a mass of rock, concrete or other solid firm material.

As is well known, when such material, which is to some extent elastic, is relieved of its stress, by removing a part of the confining support, as in open cut excavations, tunnels and other underground openings, the free rock surfaces freshly created by removing the confining support tend to "relax" or move into the opening.

An object of the invention is to devise means for measuring the amount of this movement of the fresh surface with respect to some point in depth in the rock mass a substantial distance back from the fresh surface.

Another object is to provide means for measuring movement which may occur as a result of further excavation, lapse of time and/or other changes in the state of stress in the rock mass.

Another important object is to provide means for measuring rock movement at the heading of an underground excavation, where adjacent blasting of rock using high explosives may occur, without requiring elaborate and costly protection to the measuring apparatus.

A still further object is to design a mechanically simple, rugged apparatus which can be readily used as varying conditions may require.

With the above and other objects in view and to improve generally on the details of such apparatus, the invention consists in the construction and arrangement of parts hereinafter described and claimed, and illustrated in the accompanying drawings, forming part of this specification and in which:

Figure 1:
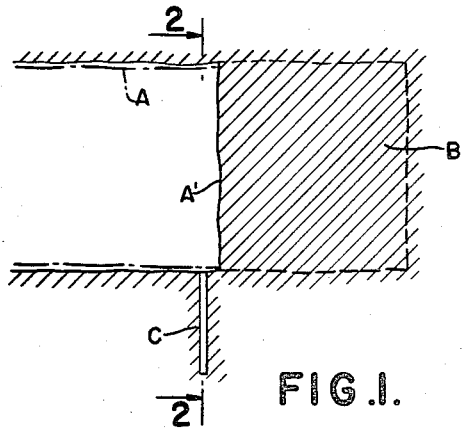
FIG. 1 is a vertical section through a portion of a partially completed tunnel, illustrating one location, by way of example, in which the apparatus may be installed.
Figure 2:
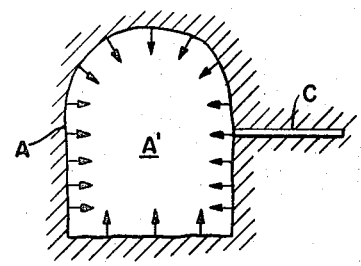
FIG. 2 is a transverse section substantially on the line 2—2 of FIG. 1, looking in the direction of the arrows.

Referring to the drawings in detail, and first more particularly to FIGS. 1 and 2, A represents a tunnel being excavated through a mass of rock. As shown, the excavation has progressed to the face A'. Then, by further excavation, the face is advanced to position B. As this advance occurs, the rock around the excavated tunnel will have a relaxing movement, as indicated by the inwardly directed arrows in FIG. 2.

In order to detect and measure such movement, the invention contemplates drilling a blind hole C into the wall of the tunnel at a point closely adjacent the face A', this hole terminating within the mass. While shown, by way of example, as extending horizontally into the side wall, this hole may be drilled vertically into the roof or floor of the tunnel, if desired. The apparatus of the invention is installed in this hole.

Figure 3:
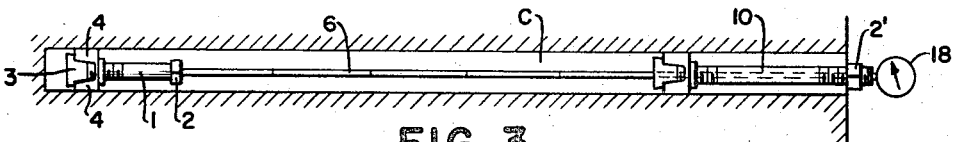
FIG. 3 is a longitudinal section through a hole bored in a rock mass, showing our measuring apparatus in place therein.

As shown in FIG. 3, the apparatus comprises an expansion bolt 1, at the inner end of the hole, and an expansion bolt 10, at the outer end of the hole, adjacent the surface of the tunnel wall. These devices will now be described in detail, by reference to FIGS. 4 to 8.

The bolt 1 is threaded at one end, and at the other end has a hexagonal nut 2, welded thereto. On the threaded end of the bolt is a nut 5, and adjacent this nut is an expandable shell 4, C-shaped in cross-section, having a gap 4a at one side. Within the far end of this shell is a tapering expanding block or nut 3, threaded on the bolt 1. When the bolt is turned, it draws this tapering block or nut inwardly, thus expanding the shell 4 into close contact with the sides of the hole, and fixedly anchoring the shell and bolt to the rock mass at the far end.

At the ends of the bolt 1 adjacent the nut 2 is a central socket, in which is inserted and welded as at 7 one end of a rod 6. This rod may be as long as necessary to reach the open end of the hole, and if desired, may be made in sections, coupled together as at 8. At the extreme end of the rod 6 is mounted a plug 9, of stainless steel, or other uncorrodable material, for the purpose hereinafter described.

Figure 7:
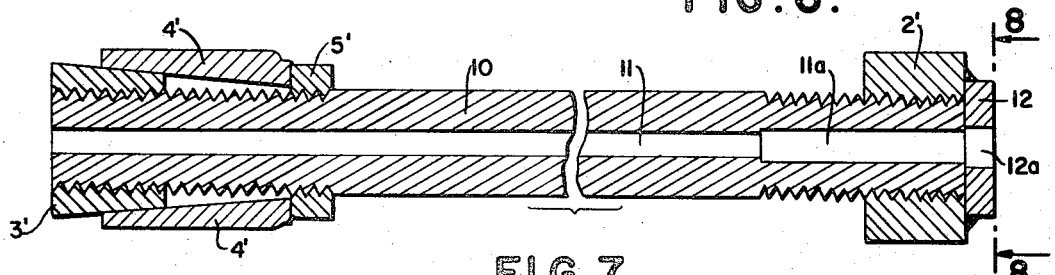
FIG. 7 is a longitudinal section, on the same scale as FIG. 4, showing a part of the apparatus not included in FIG. 4.

The expansion bolt 10, shown in detail in FIG. 7, has an opening 11 extending longitudinally throughout the length thereof, the outer end of the hole being preferably enlarged, as indicated at 11a. The inner end of the bolt is threaded on to the expansion block or nut 3', which serves to expand the shell 4' into close contact with the walls of the hole, the construction of these parts, and of the nut 5' being the same as that of the similarly marked (unprimed) parts of bolt 1, in FIGS. 4 and 5.

Figure 8:
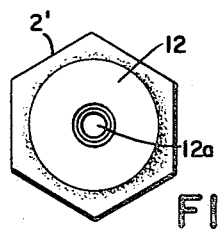
FIG. 8 is an end elevation, looking from line 8—8 of FIG. 7 in the direction of the arrows.

The outer end of the bolt 10 is threaded and has secured thereto a nut 2', to the outer face whereof is welded a plate 12, of strainless steel or other non-corrodable material, the purpose of which will be hereinafter described. As shown in FIG. 8, this plate may be circular, and has a central opening 12a registering with the opening 11 in the bolt.

Figure 9:
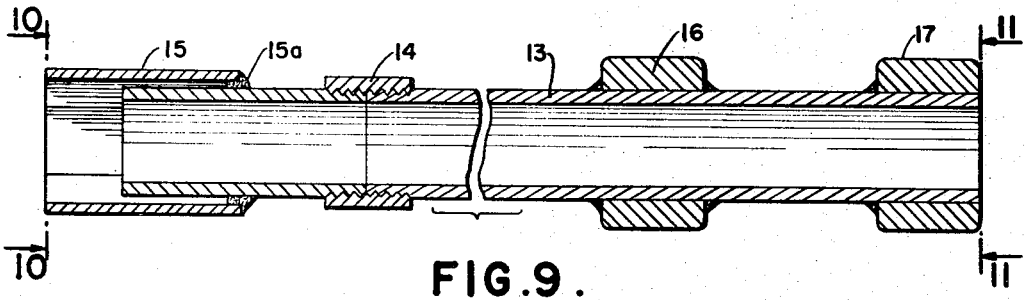
FIG. 9 is a longitudinal section of a tool used for installing the apparatus shown in FIG. 4.
Figure 10:
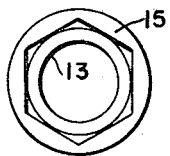
FIG. 10 is an end elevation, looking from line 10—10 of FIG. 9 in the direction of the arrows.
Figure 11:
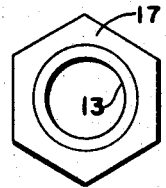
FIG. 11 is an end elevation looking from line 11—11 of FIG. 9, in the direction of the arrows.

FIG. 9 illustrates the tool used for installing the expansion bolt 1. It consists of a hollow, tubular wrench 13, which can be made in sections, if desired, united by one or more couplings 14. At one end the wrench has a socket 15, shaped to fit over the nut 2. At its other end the tubular wrench has two nuts 16 and 17 welded thereto. The purpose of the nut 16 is to provide means by which an ordinary wrench may be used to turn the tubular socket wrench. The nut 17, which is located flush with the end of the tubular wrench, is to provide a supporting surface that can rest on the operator's hand, in cases where the tubular wrench has to be held in a vertical position, as when the hole C is drilled into the roof of a tunnel, or other excavation, instead of into the side wall.

Figure 4:
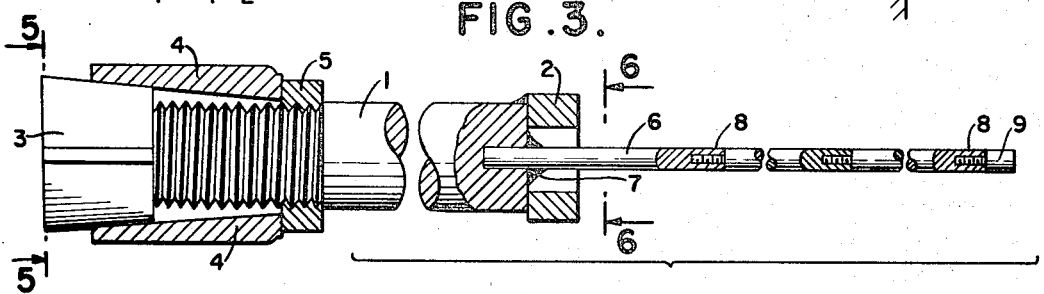
FIG. 4 is a view, on an enlarged scale, partly in longitudinal section and partly in side elevation, showing part of the apparatus illustrated in FIG. 3.
Figure 5:
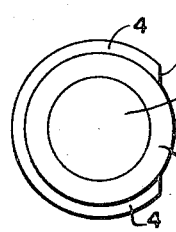
FIG. 5 is an end elevation, looking from line 5—5 of FIG. 4 in the direction of the arrows.
Figure 6:
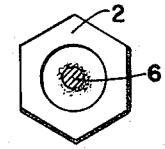
FIG. 6 is a cross-section, substantially on the line 6—6 of FIG. 4, looking in the direction of the arrows.
Figure 12:
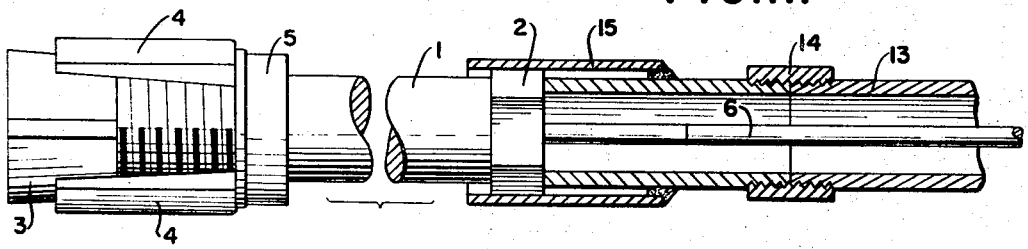
FIG. 12 is a view, on the same scale as FIGS. 4, 7 and 9, partly in side elevation and partly in longitudinal section, showing how the tool illustrated in FIG. 9 is used in installing the apparatus.

In installing the apparatus in the drilled hole C, the rod 6 is first secured to the expansion bolt 1, as by welding, as shown at 7 in FIG. 4. The assembly illustrated in FIG. 4 is then inserted in the hole, as shown in FIG. 3. Next, the tubular wrench 13 is introduced into the hole around the rod 6, until the socket 15 engages over the nut 2, as shown in FIG. 12. The tubular socket wrench is then turned by means of an ordinary wrench applied to the nut 16 (FIG. 9), thus expending the shell into close contact with the walls of the hole, thereby fixedly anchoring the bolt 1 and rod 6 to the rock mass at a point in depth. Thereupon the tubular socket wrench is removed from the hole, and the second expansion bolt 10 inserted at a point near the open end of the hole, the opening 11 through this bolt being slipped loosely over the rod 6. The shell 4' is then expanded into close contact with the walls of the hole by applying a wrench to the nut 2'. Thus the expansion bolt 10 is fixedly anchored to the rock mass at a point adjacent the surface of the tunnel wall.

Figure 13:
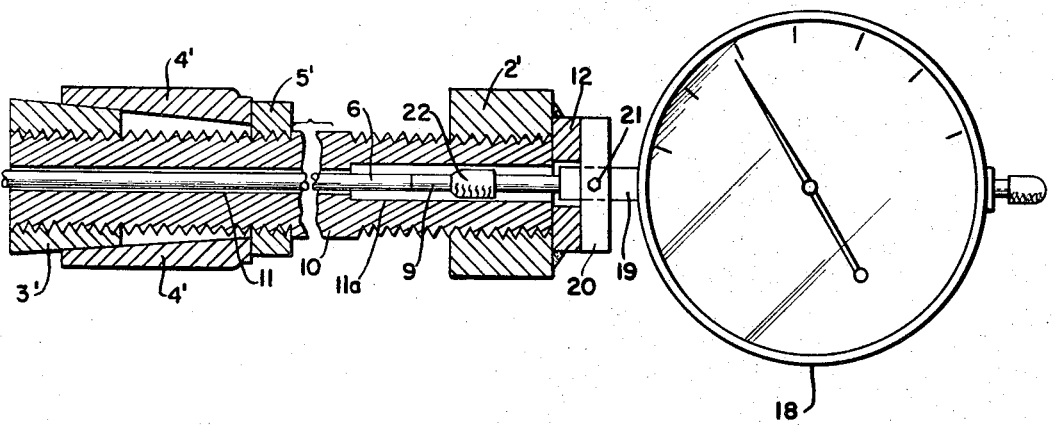
FIG. 13 is a view in longitudinal section showing how a dial-type meter is applied to the rest of the apparatus to measure the amount of rock movement.

By reference to FIG. 13 it will be noted that the rod 6 is made of such length that its free end, carrying the stainless steel plug 9, does not extend quite to the end of the bolt, but lies inside of the opening 11a in the bolt. Thus the position of the fixed plug 9, relative to the bolt 10, is the thing which determines the extent of the relaxing movement of the rock mass. The bolt 10 moves with that part of the rock mass adjacent the surface of the tunnel wall, while the plug 9 is relatively fixed at depth in the mass. The relative movement takes place between the bolts 1 and 10 and the plug 9 is rigidly connected with the bolt 1 and constitutes a reference point.

To measure this relative movement, there is utilized a portable dial-type meter 18 having a pointer actuated by a movable plunger 22. This plunger is mounted to move longitudinally through a sleeve or bushing 19, rigid with the meter. A stop member 20, shown as a disc, is secured to this sleeve as by means of a set screw 21.

To take a reading, the meter is held in the hand, and the plunger 22 inserted in the opening 11a into engagement with the plug 9. The meter is then pressed toward the end of the bolt 10, the plunger 22 engaging the unyielding plug 9 forcing the plunger back into the meter until the stop member 20 abuts against the stainless steel plate 12, as shown in FIG. 13. This causes the pointer to assume a definite position, indicating the extent of the relaxing movement.

After the lapse of a period of time, or after further excavation has taken place, additional readings may be taken, and these may indicate that the bolt 10 has shifted outwardly to a different position relative to the fixed plug 9, causing the meter to show a different measurement, due to the fact that the plunger 22 is not forced so far into the meter.

What we claim is:

1. Apparatus for detecting and measuring movement between two spaced points in a mass of solid, firm material comprising a first expansion bolt, means for expanding said first bolt to cause it to grip the material at one of said points, a second expansion bolt adjacent the other of said points, means for expanding said second bolt to cause it to grip the material at the other of said points, said expansion bolts being wholly independent of each other, a rod secured at one end to said first expansion bolt, and extending loosely through the mass of material to said second bolt, and measuring means contacting said rod for indicating the movement between said two points.

2. Apparatus in accordance with claim 1 in which the second expansion bolt is formed with a longitudinal opening into which the free end of said rod extends to cooperate with said measuring means.

3. Apparatus in accordance with claim 1 in which means independent of said rod and operated from the outer end of said hole are provided for expanding said first bolt into close contact with the walls of said hole.

4. Apparatus in accordance with claim 2 in which the measuring means is portable, and adapted to be manually brought into contact with the end of said rod when a reading is to be taken.

5. Apparatus in accordance with claim 4 in which the end of said rod terminates within said opening, and in which a dial type meter having an actuating plunger protruding therefrom is provided, said meter being operated by manual insertion of the plunger into the outer end of said opening and into engagement with the end of said rod, until the meter contacts the end of said second bolt.

6. Apparatus in accordance with claim 4 in which said meter has rigidly affixed thereto at the side from which said plunger protrudes a stop member constructed to engage the end of said second expansion bolt as said plunger is inserted in said opening, to definitely fix the final position of the meter relative to said second device.

References Cited

UNITED STATES PATENTS

| | | | |
|---|---|---|---|
| 1,120,657 | 12/1914 | Rohmer | 85—74 |
| 1,708,333 | 4/1929 | Smith | 33—147 |
| 2,492,164 | 12/1949 | Lutts | 33—147 X |
| 2,642,768 | 6/1953 | Ogburn | 85—75 |
| 3,227,031 | 1/1966 | Williams | 85—75 X |
| 3,296,919 | 1/1967 | Williams | 85—73 |

WILLIAM D. MARTIN, JR., *Primary Examiner.*

U.S. Cl. X.R.

33—172; 85—75